UNITED STATES PATENT OFFICE

2,965,452

CONVERSION OF HYDROGEN IODIDE TO IODINE

Albert P. Paul, New Brunswick, N.J., assignor to Shell Oil Company, New York, N.Y., a corporation of Delaware No Drawing. Filed Aug. 6, 1956, Ser. No. 602,434

4 Claims. (Cl. 23—216)

This invention relates to a process for recovering elemental iodine from hydrogen iodide. More particularly, this invention relates to a vapor-phase process for oxidizing hydrogen iodide to iodine, employing molecular oxygen as the oxidizing agent.

According to the art, hydrogen iodide is oxidized to iodine by molecular oxygen, viz., $$4HI + O_2 \rightarrow 2I_2 + 2H_2O$$

I have attempted to oxidize hydrogen iodide with molecular oxygen by heating a mixture of a hydrogen iodide-containing gas and a molecular oxygen-containing gas, and recovering iodine from the resulting mixture. I have found that to obtain substantially complete reaction within a reasonable time, it is necessary to heat the reaction mixture to very high temperatures—i.e., at red heat, or temperatures of the order of 600° C. I have found that at these temperatures, mixtures of hydrogen iodide, iodine and water are extremely corrosive to most of the common materials of construction. Further, I have found that at such elevated temperatures, the materials which are inert with respect to the reaction mixtures involved are not entirely stable thermally and/or mechanically. Consequently, simple vapor-phase oxidation of hydrogen iodide with molecular oxygen appears not to be practically feasible.

However, I have unexpectedly discovered that if a mixture of a hydrogen iodide-containing gas and a molecular oxygen-containing gas is passed through a heated bed of an inert, granular, non-catalytic material having a substantial geometric surface area, oxidation of the hydrogen iodide to iodine is substantially complete within quite reasonable reaction times at much lower temperatures than are required if no such contact material is present. I have found that by conducting the reaction of hydrogen iodide with molecular oxygen in this manner, substantially complete conversion of the hydrogen iodide to iodine can be effected at residence times not exceeding one minute at temperatures of the order of 200° C. to 400° C.—temperatures at which mixtures of the various compounds involved, primarily hydrogen iodide, iodine and water, are not unduly corrosive to many common materials of construction which are thermally and mechanically stable at those temperatures.

Thus, in its broadest aspect, the process of my invention comprises mixing a hydrogen iodide-containing gas and a molecular oxygen-containing gas, and passing the resulting gaseous admixture through a reaction zone in which there is present an inert, non-catalytic contact material having a large surface area in contact with the reaction mixture, and thereafter recovering the product iodine from the effluent gas mixture from the reaction zone. The reaction zone is maintained at a temperature of at least about 100° C., but not exceeding about 500° C. Preferably, the reaction zone comprises a zone of restricted cross-sectional area packed with or containing a bed of the contact material.

The new process is effective for converting hydrogen iodide to iodine regardless of the concentration of hydrogen iodide in the reaction zone—that is to say, the new process results in substantially complete conversion of the hydrogen iodide to iodine whether pure hydrogen iodide, or a gaseous mixture containing hydrogen iodide as but one component is treated. From the standpoint of practical operating efficiency, of course, it is desirable that the hydrogen iodide-containing gas treated contain as high a proportion of hydrogen iodide as is practically and economically feasible. Where a mixture of gases is treated, the part of the mixture other than hydrogen iodide may be composed of any material or materials which are substantially inert in the reaction zone. Thus, inert diluents such as nitrogen, helium or other of the inert gaseous elements, hydrogen, carbon dioxide, or other inert gaseous inorganic compounds, or the like, may be present. Also, there may be present gaseous organic materials which are not reactive with any one or all of hydrogen iodide, iodine, water, or molecular oxygen at the temperatures employed. It has been found that the presence of substantial amounts of either or both of water and iodine in the mixture to be treated will not adversely affect the conversion of hydrogen iodide to iodine, despite the fact that it might be expected that, since both compounds appear on the right hand side of the reaction equation, the presence of either or both of water and iodine might inhibit or limit the desired reaction.

Molecular oxygen from any source may be used. That is to say, pure molecular oxygen is suitable, as are mixtures of molecular oxygen with other gases, such as commercially pure (95%) oxygen, oxygen-enriched air, or air itself.

As the inert contact material, there may be used any material thermally, mechanically and chemically stable under the conditions at which the conversion of the hydrogen iodide is effected, and which does not exert a catalytic influence in the reaction zone. Suitable materials include various glass and ceramic materials, metals which are not subject to corrosion by the reaction mixtures involved, silicon carbide, aluminum oxide (Alundum, corundum), boron nitride, firebrick, naturally occurring stony materials, and the like. Preferred because of their inertness in the reaction systems involved and because of their ready availability in a wide variety of physical forms at relatively low cost are the various inactive siliceous materials and inactive forms of aluminum oxide. The siliceous materials which are suitable are those which do not have an "acid" surface, that is, materials which do not have an intrinsic surface acidity of the type found in typical clay-type cracking catalysts. Suitable siliceous materials within this definition include the various forms of silica which have not been activated, such as quartz and various forms and shapes of glass, naturally occurring stony materials, such as gravel, pebbles, stones, crushed rock, granite chips, fragments of volcanic glass, or the like, or such manufactured materials as granules, particles, fragments, chunks, pieces, filaments, extruded or molded shapes, or the like, of ceramic materials, glassy materials, porcelains, and so on, including Raschig rings, Berl saddles, porcelain tubes, porcelain or glass discs, solid or hollow spheres, porcelain or glass helices, spiral rings or the like, rock wool, chamotte, majolica, or the like. It is preferred that the contact material be a granular, substantially non-porous material, of such size distribution and shape(s) that when in place in the reactor, the bed of contact material has a porosity—that is, the ratio of the volume of voids in the bed, to the total volume of the bed—of from about 25% to about 65%. A particularly suitable packing material for use in reaction zones of restricted cross-sectional areas comprises quartz chips having a nominal particle size of from about ⅛ inch to about 3⁄16 inch diameter (i.e., 4 to 6 mesh). Depending upon the size and shape of the reaction zone, the size of the particles of the packing material may conveniently be somewhat smaller than this—e.g., to as small as one millimeter nominal diameter, or even less—or somewhat larger than this—e.g., up to 10 centimeters nominal diameter, or even greater.

The amount of contact material used is not critical. In general, the kind and physical characteristics of the contact material—primarily the percent void space and the ratio of the surface area of the contact material to the void space—together with the required residence time of the reaction mixture in the reaction zone at the chosen reaction conditions, will set the minimum amount of contact material required. More or less of the contact material can be used, as necessary to obtain the desired, or the optimum conversion of hydrogen iodide to iodine. Where it is desired to convert substantially all of the hydrogen iodide to iodine, it is normally convenient and desirable to provide a large excess of contact material to insure complete reaction; no undesirable side reactions—including the reverse of the desired reaction—are known to occur at the temperatures employed in this process.

One of the primary factors in determining the rate at which the hydrogen iodide is converted to iodine in this process is the reaction zone temperature. In general, the reaction zone temperature must be at least about 100° C. in order to attain reasonable reaction rates, and usually, practically feasible reaction rates are obtained only at somewhat higher temperatures, for example, at temperatures of 200° C. and above. Reaction temperatures above about 500° C. will not be required, for at this temperature level—and in most cases, at temperatures substantially below this level—the reaction of hydrogen iodide with molecular oxygen proceeds at very high rates. Practically satisfactory reaction rates are obtained at temperatures substantially below 500° C.—e.g., at about 300–400° C.—and because of the substantial advantages obtained from the standpoint of corrosion and the useful materials of construction available, by conducting the reaction at as low a temperature as possible consistent with a feasible reaction rate, reaction zone temperatures of from about 200° C. to about 400° C. are most suitable.

At these temperatures, practically feasible hydrogen iodide conversion levels are obtained in a few seconds reaction time. For example, at temperatures of about 300° C., hydrogen iodide conversion levels of about 80% are obtained at residence times of about 10 seconds, substantially 100% conversion being obtained at residence times of about 15–20 seconds. At 400° C., substantially 100% conversion of the hydrogen iodide is obtained at residence times of about 7–10 seconds. Thus at the preferred temperatures (200–400° C.), residence times of substantially less than about one minute normally will be sufficient to permit substantially complete conversion of hydrogen iodide to iodine. It is normally necessary to provide residence times of at least two seconds at reaction temperatures within the upper portion of the preferred range, and at least five seconds at reaction temperatures within the lower portion of the preferred range, to insure substantial conversion of the hydrogen iodide to iodine.

The amount of molecular oxygen fed to the reaction zone should be at least the amount theoretically required to convert all of the hydrogen iodide present in the reaction zone to iodine. Generally, it is desirable that the amount of molecular oxygen fed be moderately in excess of the theoretical minimum. The excess of oxygen should amount to at least 10% over that theoretically required, and in most cases, it is preferred that at least a 50% excess of oxygen be present in the reaction zone. A large excess of oxygen is not necessary, and in most cases will be undesirable because uneconomical. Usually, little advantage will accrue from the use of more than about a 500% excess of oxygen, and in most cases it is preferable that the amount of oxygen exceed the amount theoretically required to oxidize all of the hydrogen iodide present by from about 50% to about 350%.

Where air or other source of molecular oxygen contains an inert diluent gas, precaution should be taken to insure that there is a substantial partial pressure of both hydrogen iodide and molecular oxygen in the reaction zone.

The conversion of hydrogen iodide to iodine may be carried out under any pressure. Operation at substantially atmospheric pressure is quite practical, and in a great many cases will be found the most convenient operating pressure. No substantial advantages are obtained by operating at reduced pressure, but in many cases, it will be found both convenient and desirable to conduct the conversion at moderately elevated pressures—for example, at pressures of up to about 500 p.s.i.g.

Recovery of the product iodine from the effluent vapors from the reaction zone may be effected by known methods, the method used depending upon the extent to which the hydrogen iodide is converted to iodine, and also upon the nature of the components of the effluent other than iodine, water and hydrogen iodide, if any be present. Where only water and hydrogen iodide, or these compounds plus iodine, are present in the material treated according to the process of the invention, if the conversion of hydrogen iodide to iodine is substantially 100%, the iodine may be recovered most simply by cooling the effluent vapors to form liquid water and liquid or solid iodine. Since iodine is substantially insoluble in water, and liquid iodine is immiscible with liquid water, the iodine is easily recovered by filtration (where the iodine is solid) or by decantation (where the iodine is liquid). Where the conversion of the hydrogen iodide is incomplete, when the effluent vapors are cooled, part or all of the iodine will dissolve in the aqueous solution of hydrogen iodide which forms. In many cases, it will be found possible to so control the degree of hydrogen iodide conversion and the amount of water present in the effluent gases that the amount of iodine formed exceeds substantially the amount of iodine which will dissolve in the hydrogen iodide solution. This permits direct removal of a substantial part of the product iodine. The iodine dissolved in the hydrogen iodide solution may be recovered by treating the solution with a strong oxidizing agent, such as chlorine, to convert the hydrogen iodide to iodine, and separating the iodine from the water. Alternatively, the iodine dissolved in the hydrogen iodide solution may be recovered by passing an inert gas through the solution and recovering iodine from the effluent gases. This method for selectively removing iodine from mixtures of iodine, hydrogen iodide and water is disclosed and claimed in my copending application Serial No. 594,893, filed June 29, 1956, now abandoned.

The advantages of the process of the invention over the simple reaction of hydrogen iodide with oxygen shown in the art—that is, the advantages resulting from conducting the reaction in the presence of an inert, non-catalytic packing material, rather than in a free-space reaction zone—are demonstrated by the results of certain experiments I have made. In the first of these experiments, I continuously mixed a vaporous mixture of 23% by weight hydrogen iodide, 12% by weight iodine and 65% by weight of water, with sufficient air to provide twice as much molecular oxygen as would theoretically be required to react with all of the hydrogen iodide, and continuously passed the resulting mixture through an empty tube maintained at such a temperature that the gases emerging from the tube had a temperature of 300° C. The rate at which the gases were passed through the tube was such that the apparent residence time of the reaction mixture in the tube was 18.9 seconds. The effluent gases were analyzed, and by material balances, it was determined that 31% of the hydrogen iodide was converted to iodine.

In a second experiment, the first experiment was repeated except that the tube used as the reactor was packed with quartz chips of such size and shape that they would not pass through a six mesh screen, but would pass through a four mesh screen. The other conditions of the reaction were all the same as in the first experiment, except that the apparent residence time was 9.4 seconds. 80.3% of the hydrogen iodide was converted to iodine.

It is thus apparent that by conducting the oxidation of hydrogen iodide in the presence of an inert, non-catalytic packing material, well over twice as much hydrogen iodide is oxidized to iodine in about half the reaction time.

Following these preliminary experiments, I performed other experiments to establish the effect of reaction temperature and other variables on the conversion of hydrogen iodide to iodine. In typical experiments, the following results were obtained:

| Experiment No. | Reaction Zone temperature (° C.) | Excess of air, Percent | Residence time (seconds) | Percent hydrogen iodide oxidized to iodine |
|---|---|---|---|---|
| 3 | 400 | 100 | 8.0 | Substantially quantitative. |
| 4 | 300 | 100 | 18.8 | Do. |
| 5 | 200 | 200 | 10.8 | 67. |

In all of these experiments, the source of hydrogen iodide was a mixture of 23% by weight hydrogen iodide, 12% by weight iodine and 65% by weight water. 4 to 6 mesh quartz chips were used as the packing material.

It is evident from the results of these experiments that by conducting the reaction of hydrogen iodide and molecular oxygen in the presence of an inert, non-catalytic contact material, the reaction occurs at very high rates at moderately elevated temperatures—at temperatures markedly lower than the temperature required to obtain the same reaction rates in the absence of the contact material. The practical nature of the process of my invention and its advantages over processes suggested by the art are thus clearly demonstrated.

While the process of this invention is applicable to effect the decomposition of hydrogen iodide from any source, the process is of primary interest for recovering elemental iodine from the effluents of processes which employ iodine as a reactant to remove hydrogen atoms from organic materials, thus changing the carbon-to-carbon structures of such materials. In such processes, since one mole of hydrogen iodide is formed per hydrogen atom removed, the effluent vapors contain large amounts of hydrogen iodide. Also, in many cases, the product of the dehydrogenation is quite reactive with hydrogen iodide and/or iodine at the reaction temperatures, and to prevent undesirable side-reactions it is necessary to substantially reduce the temperature of the effluent gases immediately on their emergence from the reactor, and/or to dilute those gases substantially. Such quenching and/or dilution often is most conveniently accomplished by quenching the effluent gases with water, or by adding steam to the effluent gases; in these cases, the source of hydrogen iodide also contains water. Since iodine is expensive, it must be recovered from such effluent streams. The process of the invention is admirably suited to recovery of iodine from hydrogen iodide contained in the effluent streams from such processes, for it is completely operable even in the presence of major amounts of water. Further, the process of the invention is eminently suited for the conversion of large amounts of hydrogen iodide, for it employs a very cheap widely available oxidizing agent (oxygen), a very cheap, widely available packing material, and effects a high degree of conversion of hydrogen iodide under practically feasible operating conditions.

I claim as my invention:

1. A process for converting hydrogen iodide to iodine comprising passing an admixture of a hydrogen iodide-containing gas and a molecular oxygen-containing gas through a bed consisting essentially only of an inert, substantially non-porous, solid contact material selected from the group consisting of silicon carbide, boron nitride, firebrick, the inactive siliceous materials and inactive forms of aluminum oxide positioned in a reaction zone at a temperature of from about 200° C. to about 400° C.

2. A process for converting hydrogen iodide to iodine comprising passing an admixture of a hydrogen iodide-containing gas and a molecular oxygen-containing gas through a bed consisting essentially only of an inert, substantially non-porous, solid inactive siliceous contact material positioned in a reaction zone at a temperature of from about 200° C. to about 400° C.

3. A process for converting hydrogen iodide to iodine comprising passing an admixture of a hydrogen iodide-containing gas and a molecular oxygen-containing gas through a bed consisting essentially only of an inert, substantially non-porous, solid inactive form of aluminum oxide positioned in a reaction zone at a temperature of from about 200° C. to about 400° C.

4. A process according to claim 1 wherein the admixture of hydrogen iodide-containing gas and molecular oxygen-containing gas contains also a substantial amount of water vapor.

References Cited in the file of this patent

UNITED STATES PATENTS

| 1,311,175 | Meyer | July 29, 1919 |
| 2,163,877 | Hooker | June 27, 1939 |
| 2,395,314 | Blumer | Feb. 19, 1946 |
| 2,547,928 | Davis et al. | Apr. 10, 1951 |

FOREIGN PATENTS

| 14,000 | Great Britain | of 1887 |
| 15,346 | Great Britain | of 1892 |

OTHER REFERENCES

Mellor's Modern Inorganic Chemistry, 8th ed., Rev. January 1935, pages 321, 232, Longmans, Green and Co., N.Y.

Babor and Lehman: "General College Chemistry," pages 70–71, published by T. Y. Crowell Co., N.Y. (1940).

Reigel: "Industrial Chemistry," page 277; published by Reinhold Publishing Co., N.Y. (1942).